(12) United States Patent
Ishii et al.

(10) Patent No.: US 9,359,143 B2
(45) Date of Patent: Jun. 7, 2016

(54) CONVEYANCE DEVICE

(71) Applicants: Kouetsu Ishii, Miyagi (JP); Shinji Katsuta, Miyagi (JP); Akio Kimura, Kanagawa (JP); Shigeyoshi Nishihara, Shiga (JP); Toshiyuki Iba, Osaka (JP); Yutaro Hyogo, Shiga (JP)

(72) Inventors: Kouetsu Ishii, Miyagi (JP); Shinji Katsuta, Miyagi (JP); Akio Kimura, Kanagawa (JP); Shigeyoshi Nishihara, Shiga (JP); Toshiyuki Iba, Osaka (JP); Yutaro Hyogo, Shiga (JP)

(73) Assignee: DAIFUKU Co., LTD. (JP)

( * ) Notice: Subject to any disclaimer, the term of this patent is extended or adjusted under 35 U.S.C. 154(b) by 0 days.

(21) Appl. No.: 14/309,485

(22) Filed: Jun. 19, 2014

(65) Prior Publication Data

US 2014/0299449 A1 Oct. 9, 2014

Related U.S. Application Data

(63) Continuation of application No. PCT/JP2012/080354, filed on Nov. 22, 2012.

(30) Foreign Application Priority Data

Dec. 21, 2011 (JP) .................................. 2011-279102

(51) Int. Cl.

| B65G 47/00 | (2006.01) |
|---|---|
| B65G 37/00 | (2006.01) |
| B61B 13/02 | (2006.01) |
| B65G 35/06 | (2006.01) |

(52) U.S. Cl.
CPC .............. *B65G 37/005* (2013.01); *B61B 13/02* (2013.01); *B65G 35/066* (2013.01); *B65G 2201/0294* (2013.01)

(58) Field of Classification Search
CPC ......................................................... B65G 35/06
USPC .................................... 198/465.1, 465.3, 817
See application file for complete search history.

(56) References Cited

U.S. PATENT DOCUMENTS 4,676,362 A * 6/1987 Malzkorn ................... 198/465.1
5,520,276 A * 5/1996 Aoki et al. .................. 198/345.1

(Continued)

FOREIGN PATENT DOCUMENTS

| JP | 57067408 A | 4/1982 |
|---|---|---|
| JP | 60221229 A | 11/1985 |
| JP | 2009091056 A | 4/2009 |

(Continued)

OTHER PUBLICATIONS

International Search Report Application No. PCT/JP2012/080354 Completed: Feb. 25, 2013; Mailing Date: Mar. 5, 2013 1 page.

*Primary Examiner* — Gene Crawford
*Assistant Examiner* — Lester Rushin
(74) *Attorney, Agent, or Firm* — St. Onge Steward Johnston & Reens LLC

(57) ABSTRACT

A conveyance device has a carriage drive for driving and propelling a pair of left and right carriage units which individually support left and right sides of an object to be conveyed. A pair of left and right screw shafts is pivotally supported in a rotatable manner along the movement path of the carriage units. Driven rollers are pivotally supported in a rotatable manner by the carriage units and engage with the screw shafts. A transmission connects the pair of left and right screw shafts through the outside of a conveyance path such that the left and right screw shafts are linked and coupled; and a single motor drives the pair of left and right screw shafts through the transmission means.

5 Claims, 13 Drawing Sheets

(56) References Cited

U.S. PATENT DOCUMENTS

| | | | |
|---|---|---|---|
| 8,272,500 B2 * | 9/2012 | Nishikawa et al. | 198/657 |
| 2006/0045672 A1 * | 3/2006 | Maynard et al. | 414/276 |

FOREIGN PATENT DOCUMENTS

| | | |
|---|---|---|
| JP | 2009202691 A | 9/2009 |
| JP | 2011020809 A | 2/2011 |

* cited by examiner

CONVEYANCE DEVICE

FIELD OF THE INVENTION

The present invention relates to a conveyance device provided with a conveying carriage composed of a pair of left and right carriage units individually supporting left and right both sides of an object to be conveyed, and a carriage drive means driving and propelling both of the pair of left and right carriage units in order to move this conveying carriage along a conveyance path.

BACKGROUND OF THE INVENTION

As conveyance devices of this kind, there are known an electric car type in which the pair of left and right carriage units of the conveying carriage are individually installed with a traveling drive motor for driving traveling wheels of the carriage units as described in Patent Document 1, and a friction drive type in which either or both of the pair of left and right carriage units are moved and driven by motor-driven friction drive wheels arranged at regular intervals on the movement path side as described in Patent Document 2.

PRIOR ART DOCUMENTS

Patent Documents

Patent Document 1: Japanese Published Unexamined Patent Application No. 2011-20809
Patent Document 2: Japanese Published Unexamined Patent Application No. 2009-202691

SUMMARY OF THE INVENTION

Problem to be Solved by the Invention

The traveling speeds of the pair of left and right carriage units need to be synchronized by electrical control of the motor in the electric car type described in Patent Document 1. However, controlling to make absolute ground speeds in perfect agreement is difficult. Moreover, at least two traveling drive motors are necessary for each conveying carriage of which a large number are used. Including control means for synchronous control, equipment costs are disadvantageously and remarkably high. Further, it is difficult in the friction drive type described in Patent Document 2 to stably move and drive both of the pair of left and right carriage units just as a single conveying carriage while the absolute ground speeds are in perfect agreement, granting that both of the pair of left and right carriage units are configured to be able to be frictionally driven. If even a slight difference in traveling speed arises between the pair of left and right carriage units, a positional deviation in the carriage traveling direction is caused between conveyed object supporting tools provided for each carriage unit and the object to be conveyed supported. As a result, this leads to a problem that supported places of the object to be conveyed or the conveyed object supporting tools are damaged.

Means for Solving the Problem

The present invention proposes a conveyance device capable of solving the foregoing conventional problem. Described by giving reference signs in parentheses used in a description of an embodiment which will be described later in order to facilitate understanding of the relationship with the embodiment, a conveyance device according to the present invention is provided with a conveying carriage (1) composed of a pair of left and right carriage units (7a, 7b) individually supporting left and right sides of an object to be conveyed (W), and a carriage drive means configured to drive and propel both of the pair of left and right carriage units (7a, 7b) in order to move the conveying carriage (1) along a conveyance path (2), wherein the carriage drive means is composed of a pair of left and right screw shafts (8a, 8b) pivotally supported along respective movement paths of the carriage units (7a, 7b), a driven roller (35a to 35c) pivotally supported to each carriage unit (7a, 7b) and engaged with the screw shaft (8a, 8b), a transmission means (26) configured to link and couple the pair of left and right screw shafts (8a, 8b) to each other through the outside of the conveyance path (2), and single motor (27) linking and driving both of the pair of left and right screw shafts (8a, 8b) via the transmission means (26).

Effects of the Invention

According to the above configuration of the present invention, the pair of left and right carriage units supporting an object to be conveyed are driven by corresponding screw shafts on a side of the movement path. Thus, each carriage unit is accurately propelled at a speed determined by the rotation speed of the screw shaft. That is, there is no possibility that variations in traveling speed of respective carriage units are caused due to slip between the friction drive surface of each carriage unit and the friction drive wheels at the movement path side and abrasion of the friction drive wheels, even if the rotation speed of the friction drive wheels is constant, as in the friction drive type. Each carriage unit can be accurately propelled at a speed determined by the rotation speed of the screw shaft as long as the rotation speed of the screw shaft is not changed. Moreover, the pair of left and right screw shafts individually driving the pair of left and right carriage units are not individually motor-driven but are driven by a common motor. Therefore, electrical synchronous control is unnecessary, and the pair of left and right screw shafts can be rotationally driven in exact synchronization with each other while the number of motors is reduced. Accordingly, the pair of left and right carriage units can be exactly synchronized and moved just as a single carriage while equipment costs are reduced. The problem resulting from a difference in speeds between the left and right carriage units supporting one object to be conveyed can be fully solved. Further, where the length of the conveyance path in which the conveying carriage is propelled and driven by the screw shafts becomes long, the entire length of the conveyance path may be divided into a plurality of areas and a pair of left and right screw shafts driven by one motor may be pivotally supported at each area.

When the above present invention is carried out, the transmission means (26) can be composed of a horizontal traverse transmission shaft (28) horizontally crossing under the conveyance path (2) at an end portion of the conveyance path (2), a pair of left and right vertical relay transmission shafts (30c, 30d) linked and coupled to both end portions of the horizontal traverse transmission shaft (28), and a gear mechanism (33a, 33b) linking and coupling the both vertical relay transmission shafts (30c, 30d) and the respective screw shafts (8a, 8b), and the motor (27) can be linked and coupled to one end of the horizontal traverse transmission shaft (28).

Further, the movement path for each carriage unit (7a, 7b) can be composed of a lower main guide rail (10) guiding a lower end side of the carriage unit (7a, 7b) and an upper auxiliary guide rail (11) guiding an upper end side of the carriage unit (7a, 7b), and these both upper and lower guide rails (10, 11) can be individually supported via individual upper and lower cantilever support members (13, 14) disposed at a side opposite to a side where the conveyance path (2) is located with respect to the respective guide rails (10, 11), and the driven roller (35a to 35c) of each carriage unit (7a, 7b) can be protruded from each carriage unit (7a, 7b) to the outside that is opposite to the side where the conveyance path (2) is located, at a height between the upper and lower guide rails (10, 11), and the screw shaft (8a, 8b) can be pivotally supported so as to penetrate between the upper and lower cantilever support members (13, 14). According to this configuration, each carriage unit and the screw shaft can be arranged in parallel in the lateral horizontal direction. As a result, maintenance and inspection work of the screw shafts can be performed easily regardless of the position of the conveying carriage as compared with the configuration that the screw shafts are disposed under the carriage units. Further, sides of the object to be conveyed do not cover the upper side of the carriage units but the respective carriage units are arranged in parallel at the left and right sides of the object to be conveyed. Thus, maintenance and inspection work of each carriage unit can be performed easily even while supporting the object to be conveyed.

Additionally, each carriage unit (7a, 7b) can have a structure provided with a carriage main body (15) disposed at a side where the screw shaft (8a, 8b) is located with respect to both the upper and lower guide rails (10, 11), a conveyed object supporting tool mounting member (16) extending downward from the carriage main body (15) to the inside where the conveyance path (2) is located, through between both the upper and lower guide rails (10, 11), a main wheel (17) pivotally supported at the side where the conveyance path (2) for the carriage main body (15) is located so as to be rotatable about a horizontal axis and rolling on the lower main guide rail (10), an outer positioning roller (18) pivotally supported at a lower end of the carriage main body (15) so as to be rotatable about a vertical axis and rolling on a part of an outer surface of the lower main guide rail (10) and above the cantilever support member (13), an inner positioning roller (19) pivotally supported at the conveyed object supporting tool mounting member (16) so as to be rotatable about the vertical axis and rolling on a lower end portion of an inner surface of the lower main guide rail (10), and a pair of left and right steady rollers (20a, 20b) pivotally supported at an upper end portion of the carriage main body (15) so as to be rotatable about the vertical axis and sandwiching a lower end portion of the upper auxiliary guide rail (11) from both inside and outside. According to this configuration, the main wheels for each carriage unit, the outer positioning roller, and one of the pair of left and right steady rollers which is pivotally supported just above the carriage unit can be directly and pivotally supported to the carriage unit without concurrently using a special support member extending from the carriage unit. The inner positioning roller requiring a special support member extending from the carriage unit has a configuration that uses the conveyed object supporting tool mounting member extending downward from the carriage unit to the inside as the special support member. Thus, the configuration of the carriage unit including each wheel and roller can be simplified and carried out at a low cost. Moreover, each carriage unit which supports the object to be conveyed located at one side while standing vertically can be supported stably.

DETAILED DESCRIPTION OF THE INVENTION

Figure 1:
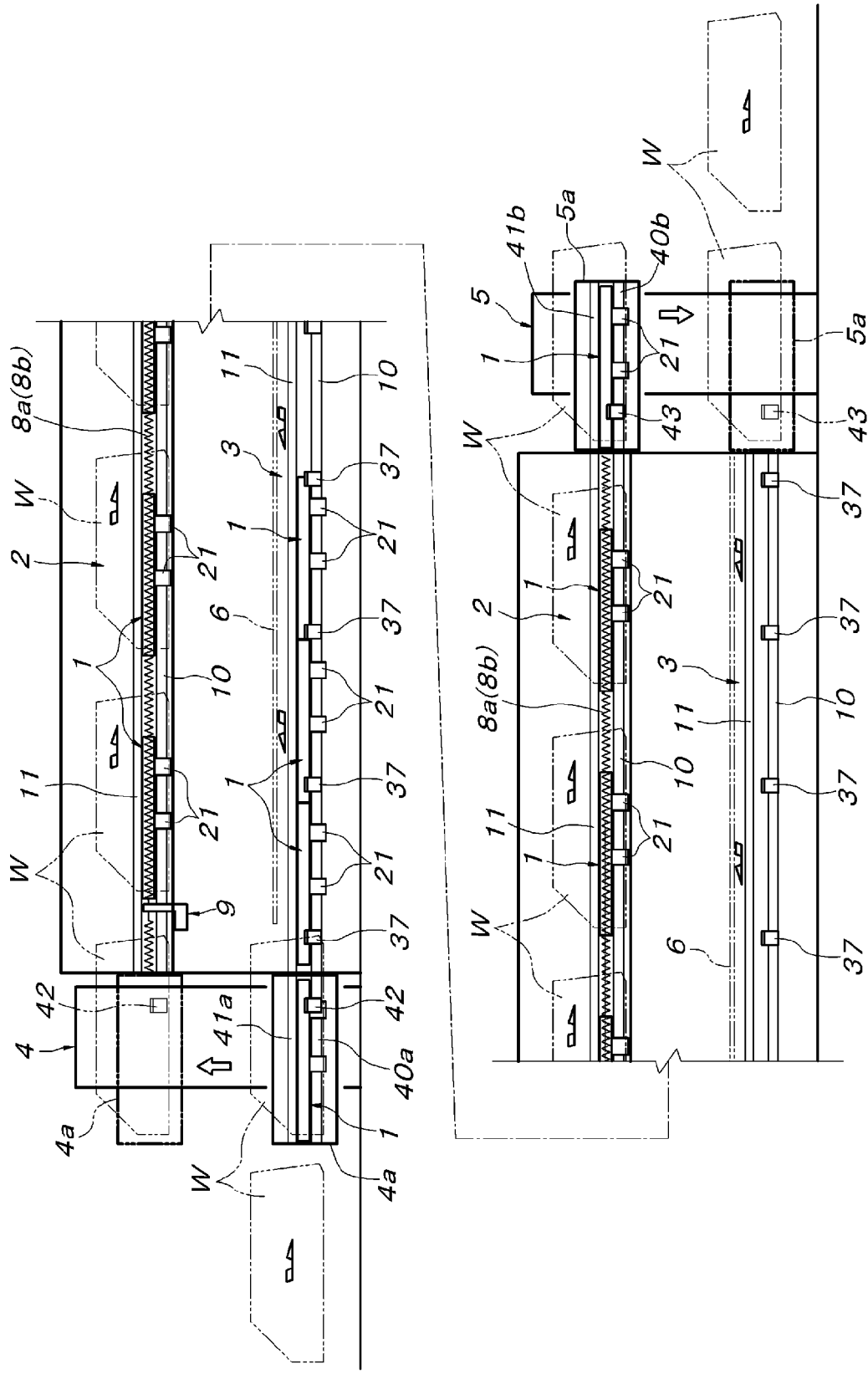
FIG. 1 is a schematic side view of the entire conveyance equipment using a conveyance device of the present invention.
Figure 2:
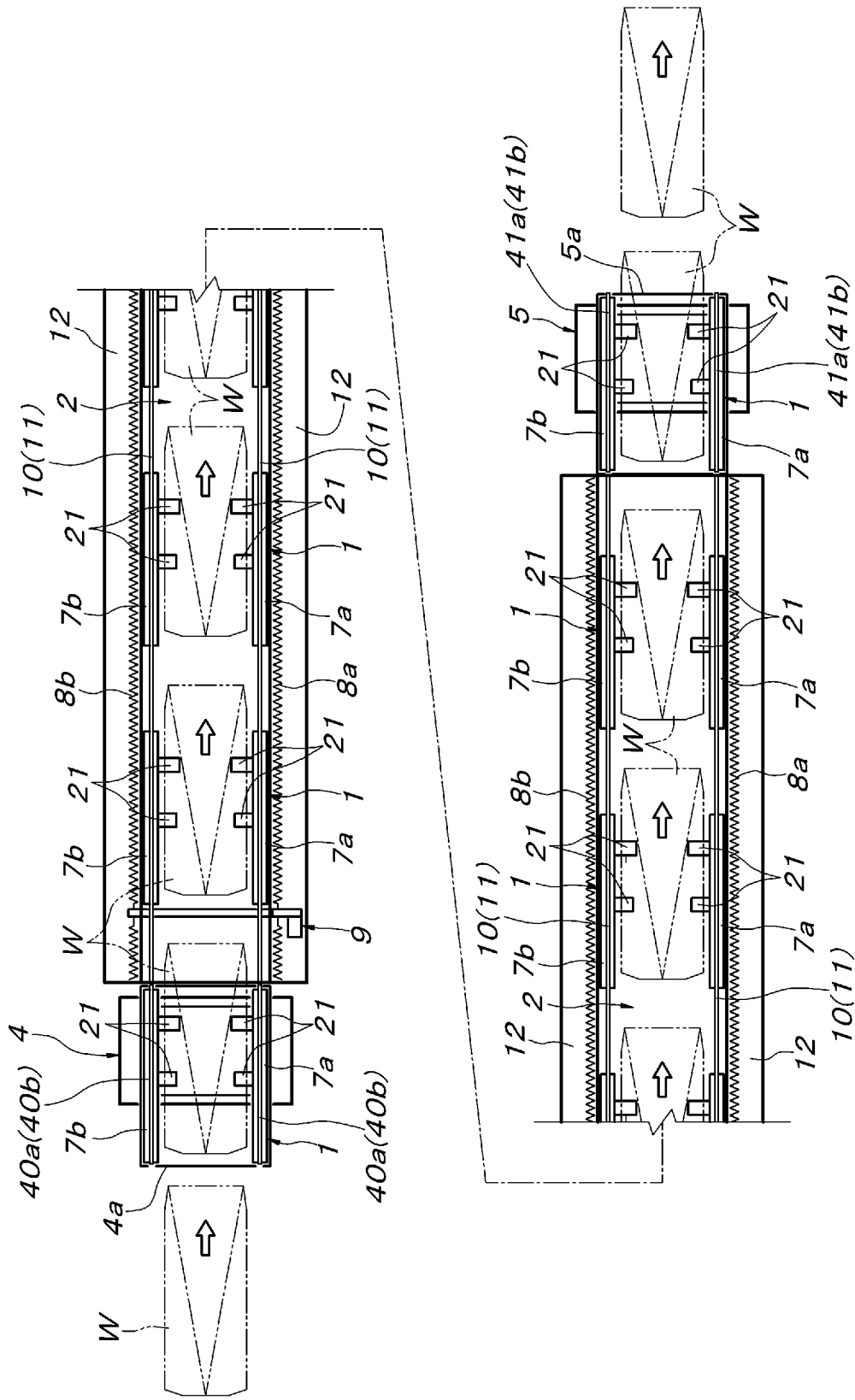
FIG. 2 is a schematic plan view of the conveyance equipment.
Figure 3:
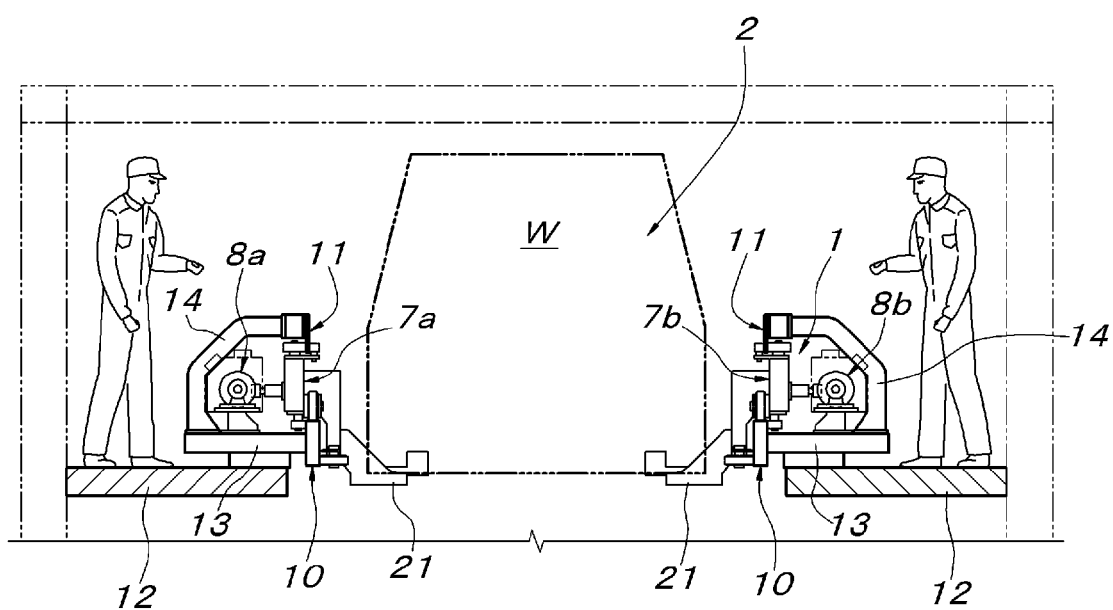
FIG. 3 is a schematic longitudinal sectional front view on a conveyance path for an object to be conveyed of the conveyance equipment.
Figure 4:
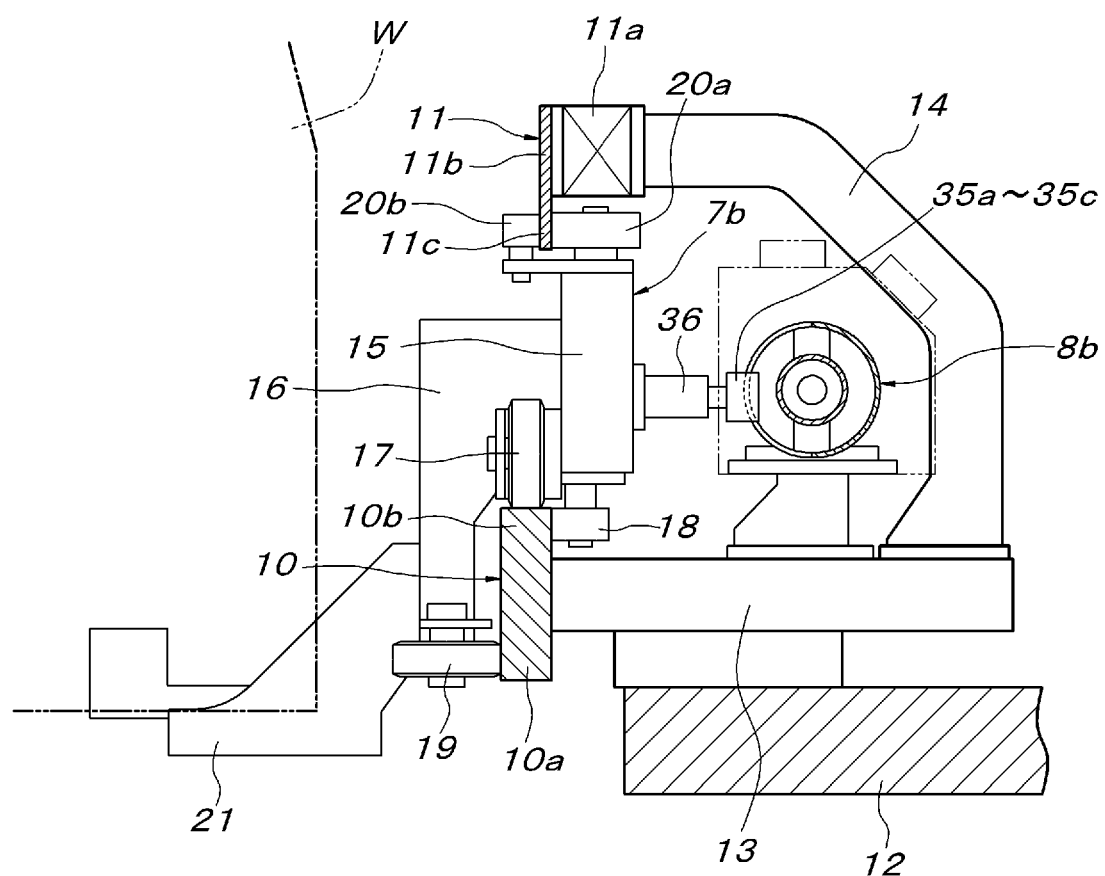
FIG. 4 is an enlarged view showing details of a main part of FIG. 3.

A conveyance equipment shown in FIG. 1 and FIG. 2 is constituted of an upper horizontal conveyance path 2 on which a conveying carriage 1 supporting an object to be conveyed W such as an automobile vehicle body travels, a lower carriage return path 3 on which the conveying carriage 1 having been emptied travels in the reverse direction, a carriage lifting and transfer device 4 lifting and transferring the conveying carriage 1 from the terminal end of the lower carriage return path 3 to the beginning of the upper horizontal conveyance path 2, and a carriage lowering and transfer device 5 lowering and transferring the conveying carriage 1 from the terminal end of the upper horizontal conveyance path 2 to the beginning of the lower carriage return path 3. The conveyance device of the present invention constitutes the upper horizontal conveyance path 2. Signs 4a and 5a denote an elevating carriage for transferring the conveying carriage 1 in the carriage lifting and transfer device 4 and the carriage lowering and transfer device 5. Sign 6 denotes a floor slab disposed above the lower carriage return path 3 and parallel with the upper horizontal conveyance path 2. A worker who performs work with respect to the bottom of the object to be conveyed W conveyed at the upper horizontal conveyance path 2 can use the floor slab.

Hereinafter, the conveyance device of the present invention constituting the foregoing upper horizontal conveyance path 2 of the conveyance equipment will be described. The conveying carriage 1 of this conveyance device is composed of a pair of left and right carriage units 7a, 7b disposed so as to sandwich a conveyance path for the object to be conveyed W and individually supporting the left and right sides of the object to be conveyed W, as shown in FIG. 2. A pair of left and right screw shafts 8a, 8b individually driving and propelling this pair of left and right carriage units 7a, 7b are supported parallel with the movement path for the conveying carriage 1. Sign 9 denotes a screw shaft drive means linking and driving the pair of left and right screw shafts 8a, 8b.

Each of movement paths for the pair of left and right carriage units 7a, 7b constituting the conveying carriage 1 is composed of a lower main guide rail 10 disposed horizontally at a level close to the lower end of the object to be conveyed W conveyed at the upper horizontal conveyance path 2, and an upper auxiliary guide rail 11 disposed horizontally at a position almost immediately above this lower main guide rail 10, as shown in FIGS. 3 to 6. The lower main guide rail 10 is elongated in longitudinal cross section having a lower end rail portion 10*a* and an upper end rail portion 10*b*. An inner end of a horizontal and lateral lower cantilever support member 13 installed on a stand 12 at an appropriate interval in the longitudinal direction of the guide rail is coupled outside (a side opposite to the side where the conveyance path for the object to be conveyed W is located) at an intermediate height of both the upper and lower rail portions 10*a*, 10*b*, whereby the lower main guide rail 10 is supported. The upper auxiliary guide rail 11 is such that an upper half portion of a band plate 11*b* disposed so as for its width direction to be vertical is attached to an inner side (a side where the conveyance path for the object to be conveyed W is located) of a strength member 11*a* disposed along the longitudinal direction of the rail and a lower half portion of the band plate 11*b* serves as a rail portion 11*c*. An inner end of an upper cantilever support member 14 attached on an outer end portion of the lower cantilever support member 13 and having an upper end portion bent inward is coupled outside of the strength member 11*a*, whereby the upper auxiliary guide rail 11 is supported.

The pair of left and right carriage units 7*a*, 7*b* constituting the conveying carriage 1 have a bilaterally symmetrical structure and include a carriage main body 15 long in the moving direction and having a vertically long cross sectional shape, a pair of front and rear conveyed object supporting tool mounting members 16, a pair of front and rear main wheels 17, a pair of front and rear outer positioning rollers 18, a pair of front and rear inner positioning rollers 19, a pair of front and rear outer steady rollers 20*a*, and inner steady rollers 20*b*.

The carriage main body 15 is disposed outside between the lower main guide rail 10 and the upper auxiliary guide rail 11. The pair of front and rear conveyed object supporting tool mounting members 16 extend downward from the carriage main body 15 to the inside where the conveyance path for the object to be conveyed W is located, through between both the upper and lower guide rails 10, 11. Each conveyed object supporting tool mounting member 16 has a lower end to which inside a conveyed object supporting tool 21 adapted to support both the left and right sides of the bottom of the object to be conveyed W is attached. The pair of front and rear main wheels 17 are pivotally supported to the carriage main body 15 at the side where the conveyance path for the object to be conveyed W is located, so as to be rotatable about the horizontal axis. The main wheels 17 roll on the lower main guide rails 10. The pair of front and rear outer positioning rollers 18 are pivotally supported at the lower ends of the carriage main bodies 15 at positions closer to both ends of the conveying main bodies 15 than the pair of front and rear main wheels 17 so as to be rotatable about the vertical axis. Each of these outer positioning rollers 18 rolls on a part of an outer surface of the lower main guide rail 10 and above the lower cantilever support member 13. The pair of front and rear inner positioning rollers 19 are pivotally supported to the corresponding conveyed object supporting tool mounting members 16 so as to be rotatable about the vertical axis, and the inner positioning rollers 19 roll on a lower end portion of an inner surface of the lower main guide rail 10. The pair of front and rear outer steady rollers 20*a* are pivotally supported to an upper end portion of the carriage main body 15 at a position above the corresponding outer positioning roller 18 so as to be rotatable about the vertical axis. The outer steady rollers 20*a* roll on an outer surface of the rail portion 11*c* of the upper auxiliary guide rail 11. The inner steady roller 20*b* is pivotally supported on a bearing plate extending horizontally inward from the upper end of the carriage main body 15 so as to be rotatable about the vertical axis, and sandwiches the rail portion 11*c* of the upper auxiliary guide rail 11 with the outer steady roller 20*a*.

The screw shafts 8*a*, 8*b* are horizontally supported within a pair of left and right spaces surrounded by the stands 12, the lower cantilever support members 13, the upper cantilever support members 14, and the carriage main bodies 15 when viewed from the front, and continuing parallel with the conveyance path at both lateral sides thereof. These screw shafts 8*a*, 8*b* are configured by linking and coupling a plurality of screw units 23 having a unit length by shaft couplings 24 and relay shaft bodies 25 provided with universal shaft couplings 25*a*, 25*b* at both ends thereof. Each screw unit 23 is composed of a cylindrical shaft body 23*a* and a screw main body 23*b*. The cylindrical shaft body 23*a* has both ends supported on the stand 12 by bearings 22. The screw main body 23*b* is formed by cutting a spiral slit in a cylindrical body having a diameter larger than the cylindrical shaft body 23*a* in such a manner that both ends of the slit are opened at both ends of the cylindrical body, and the screw main body 23*b* is concentrically and integrally fitted outside the cylindrical shaft body 23.

Figure 7:
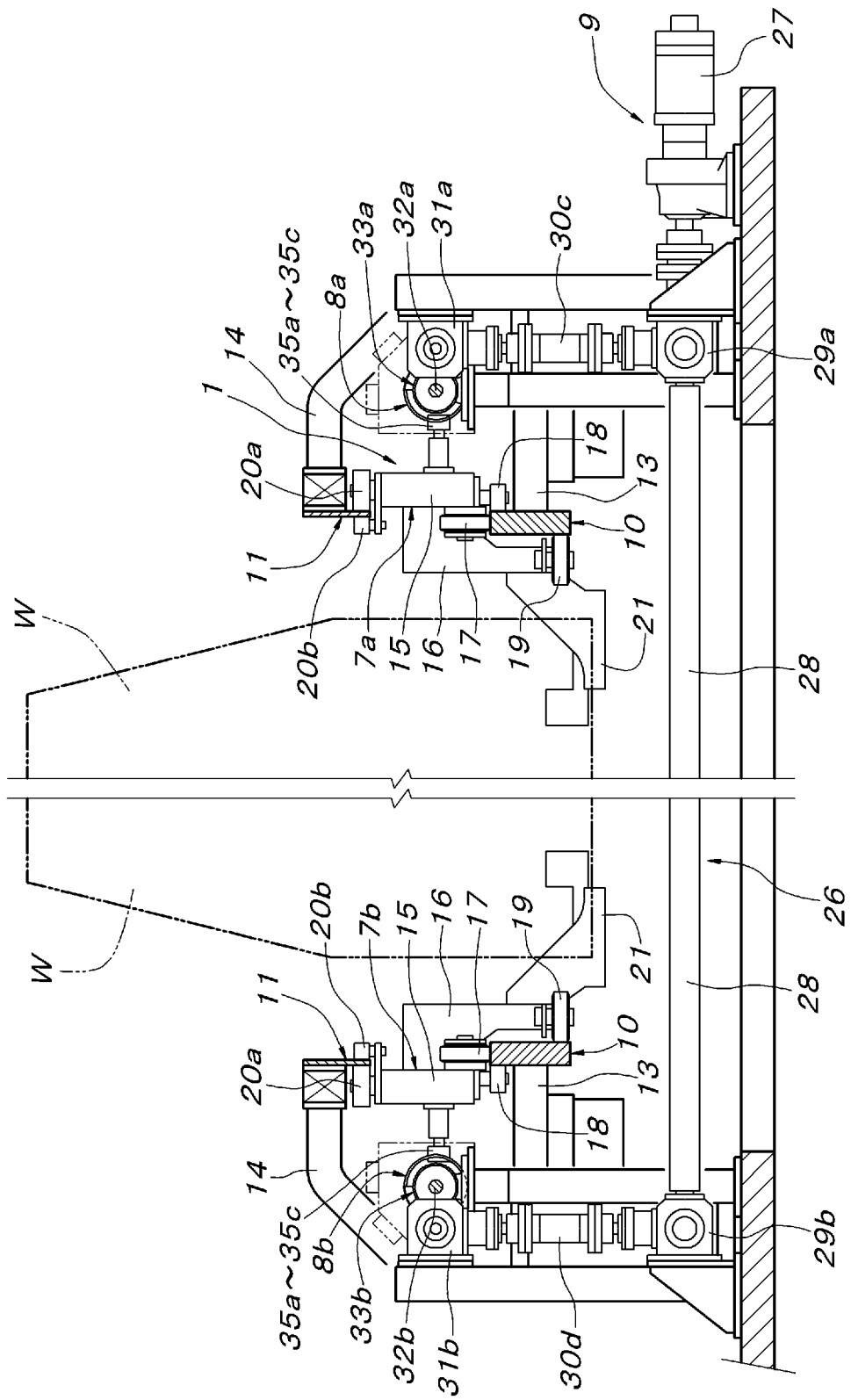
FIG. 7 is a partially omitted rear view showing a drive means linking and rotationally driving a pair of left and right screw shafts.
Figure 8:
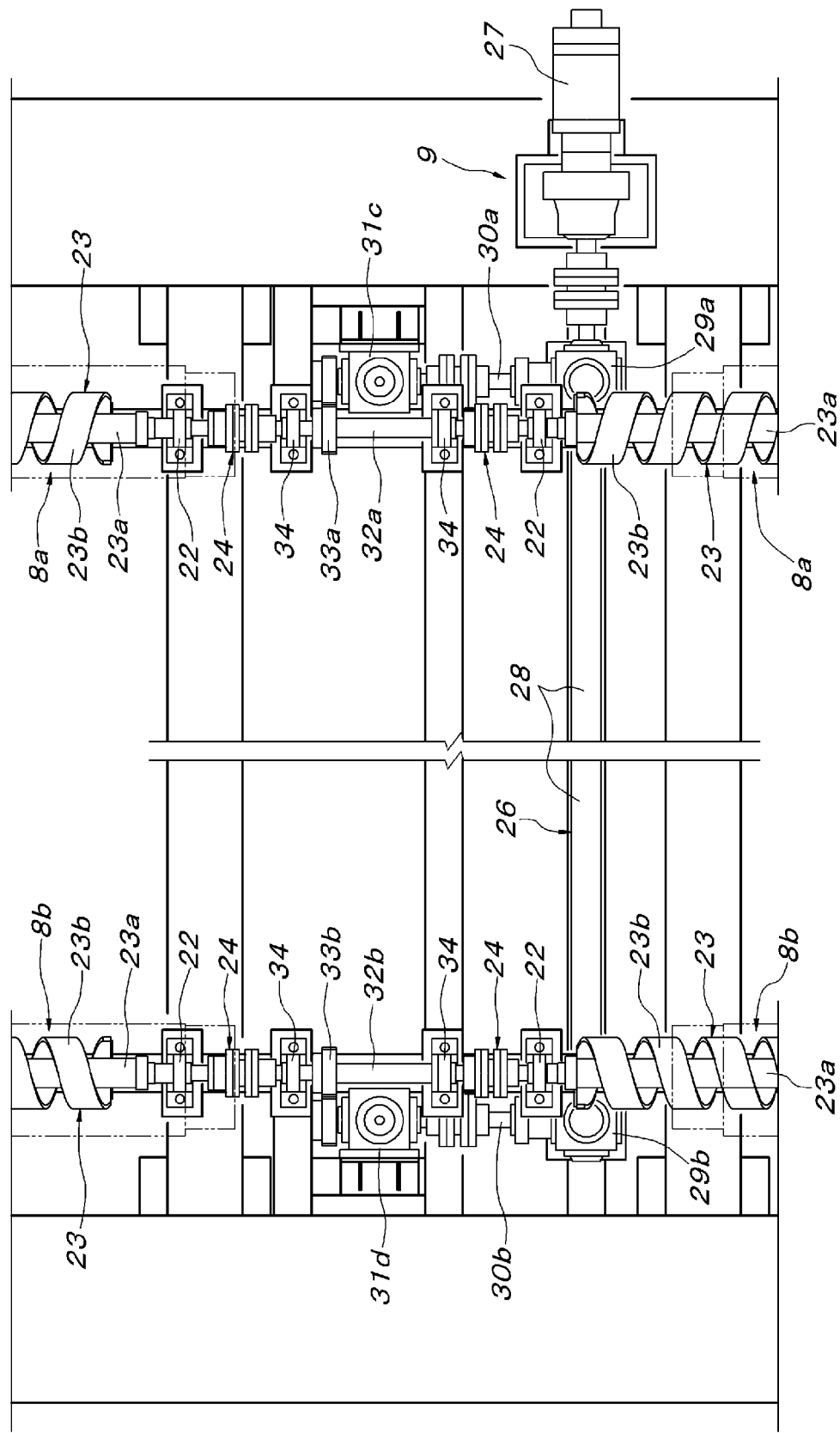
FIG. 8 is a plan view of FIG. 7.
Figure 9:
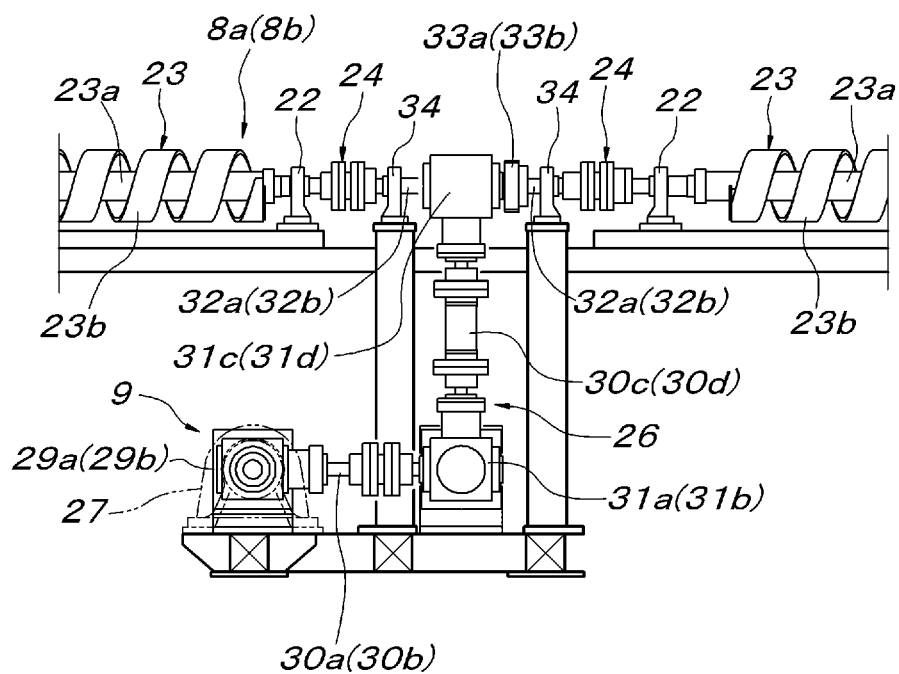
FIG. 9 is a right side view of FIG. 7.

The thus configured pair of left and right screw shafts 8*a*, 8*b* are rotationally driven in conjunction with each other at the same speed in a predetermined direction by the screw shaft drive means 9 disposed at a position near the entrance of the upper horizontal conveyance path 2, as shown in FIG. 1 and FIG. 2. The screw shaft drive means 9 is composed of a transmission means 26 linking and coupling both screw shafts 8*a*, 8*b* to each other, and single motor 27 linking and driving both of the pair of left and right screw shafts 8*a*, 8*b* via the transmission means 26, as shown in FIGS. 7 to 9.

The transmission means 26 is constituted of a laterally-oriented horizontal traverse transmission shaft 28 horizontally crossing under the conveyance path for the object to be conveyed W, horizontal relay transmission shafts 30*a*, 30*b* linked and coupled to both end portions of the horizontal traverse transmission shaft 28 via right-angled transmission mechanisms 29*a*, 29*b* and disposed at the same level as the horizontal transmission shaft 28 and parallel with the respective screw shafts 8*a*, 8*b*, vertical relay transmission shafts 30*c*, 30*d* linked and coupled to the horizontal relay transmission shafts 30*a*, 30*b* via right-angled transmission mechanisms 31*a*, 31*b*, right-angled transmission mechanisms 31*c*, 31*d* linked and coupled to the upper end of the vertical relay transmission shafts 30*c*, 30*d*, gear mechanisms 33*a*, 33*b* composed of a pair of spur gears linking and coupling horizontal output shafts of the right-angled transmission mechanisms 31*c*, 31*d* and relay shaft bodies 32*a*, 32*b* interposed in the screw shafts 8*a*, 8*b*. The relay shaft bodies 32*a*, 32*b* interposed in the screw shafts 8*a*, 8*b* link and couple shaft bodies 23*a* of the screw units 23 in front and in the rear thereof together, and have both ends supported by bearings 34. The motor 27 is linked and coupled to one end of the horizontal traverse transmission shaft 28 via the right-angled transmission mechanism 29*a*.

According to the thus configured screw shaft drive means 9, by operation of the motor 27, its rotational force rotationally drives the relay shaft body 32*a* of the screw shaft 8*a* via the right-angled transmission mechanism 29*a*, the horizontal relay transmission shaft 30*a*, the right-angled transmission mechanism 31*a*, the vertical relay transmission shaft 30*c*, the right-angled transmission mechanism 31*c*, and the gear mechanism 33*a*, and at the same time, rotationally drives the relay shaft body 32*b* of the screw shaft 8*b* via the right-angled transmission mechanism 29a, the horizontal traverse transmission shaft 28, the right-angled transmission mechanism 29b, the horizontal relay transmission shaft 30b, the right-angled transmission mechanism 31b, the vertical relay transmission shaft 30d, the right-angled transmission mechanism 31d, and the gear mechanism 33b. Thus, the pair of left and right screw shafts 8a, 8b can be rotationally driven at the same speed in the predetermined direction.

Figure 5:
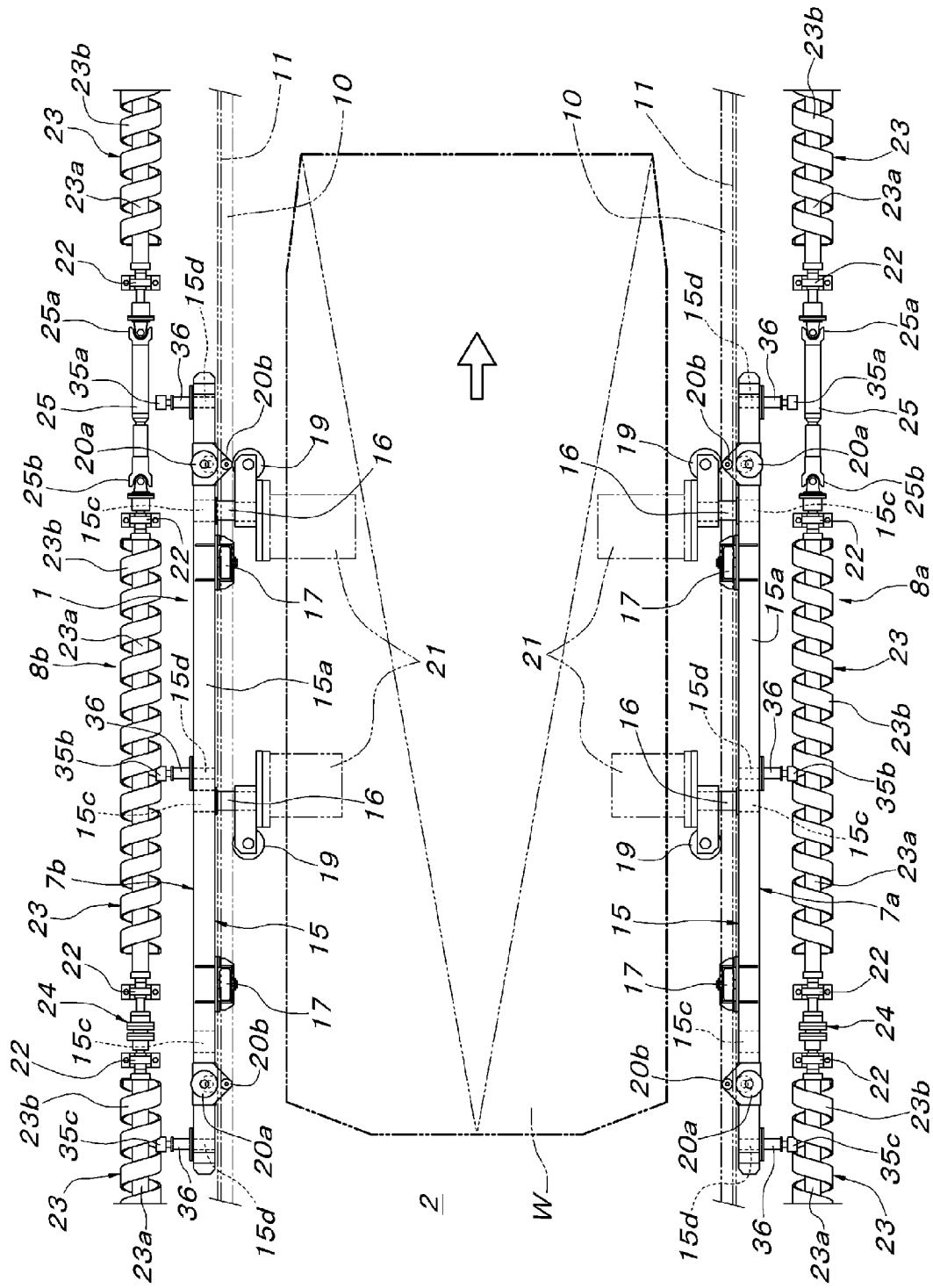
FIG. 5 is an enlarged view showing details of a main part of FIG. 2.
Figure 6:
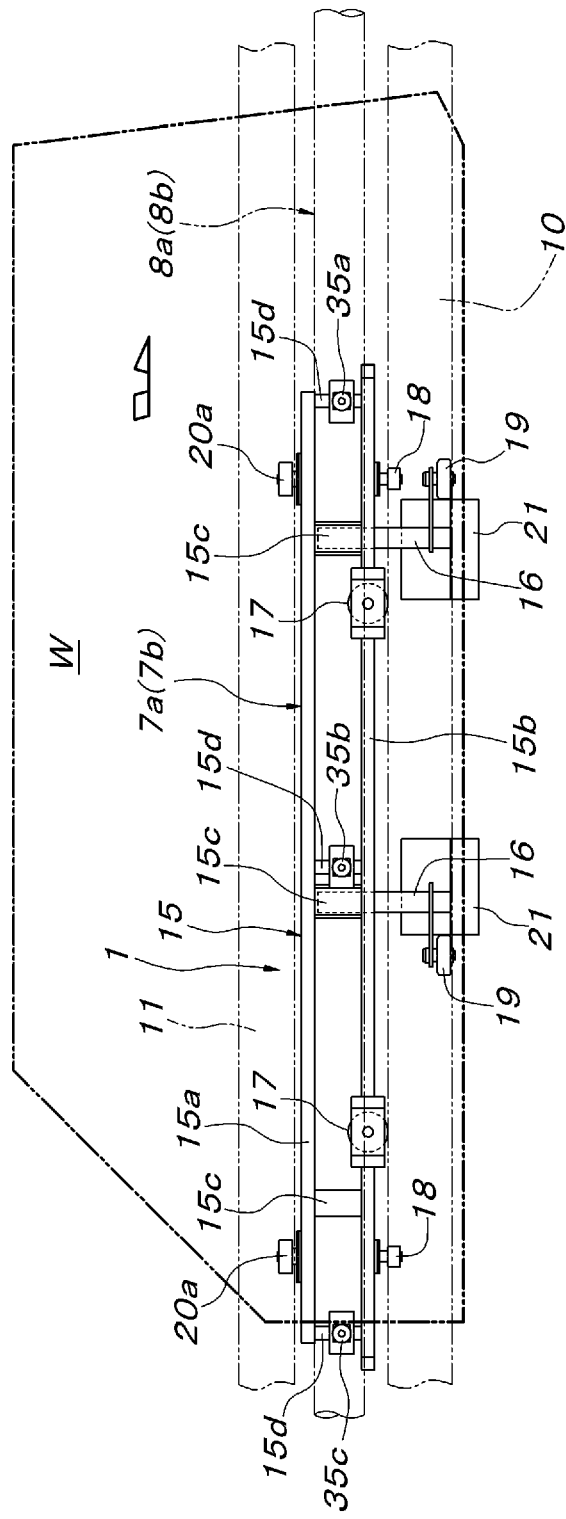
FIG. 6 is a side view when a carriage unit on one side constituting the conveying carriage is viewed from the inside.

Each of the pair of left and right carriage units 7a, 7b constituting the conveying carriage 1 is provided with driven rollers 35a to 35c at three places of both ends and a middle part in the longitudinal direction (the moving direction) of the carriage main body 15 as shown in FIG. 5 and FIG. 6. Each of the driven rollers 35a to 35c is pivotally supported at a distal end of a bearing member 36 horizontally protruded outward at an intermediate height of the carriage main body 15, so as to be rotatable about a horizontal lateral spindle at a level almost orthogonal to the axial center of the screw shafts 8a, 8b. The driven rollers 35a to 35c are each fitted to the spiral slit of the screw main body 23b of each screw unit 23 of the screw shafts 8a, 8b. In the foregoing configuration, intervals for the three driven rollers 35a to 35c provided for the carriage units 7a, 7b are set so as for one or two of the three driven rollers 35a to 35c to be constantly fitted to the spiral slit of the screw main body 23b regardless of existence of a non-driving area on the screw shafts 8a, 8b in which the screw main bodies 23b are disconnected, that is, the non-driving area in which the shaft coupling 24 and the relay shaft bodies 25, 32a, and 32b between the screw units 23 are present.

The propulsion drive means for the conveying carriage 1 at the lower carriage return path 3 may be any, and friction drive means 37 arranged at both lateral sides of the movement path for the conveying carriage 1 at intervals almost identical to the entire length of the carriage main body 15 of each carriage unit 7a, 7b are used in this embodiment. That is, the lower carriage return path 3 is not provided with the screw shafts 8a, 8b and the screw shaft drive means 9 therefor, and accordingly, the upper cantilever support member 14 supporting the upper auxiliary guide rail 11 at the distal end thereof is disposed so as to come close to the moving path of the carriage main body 15 in order to secure only a moving space of the driven rollers 35a to 35c inside as shown in FIG. 10.

Figure 10:
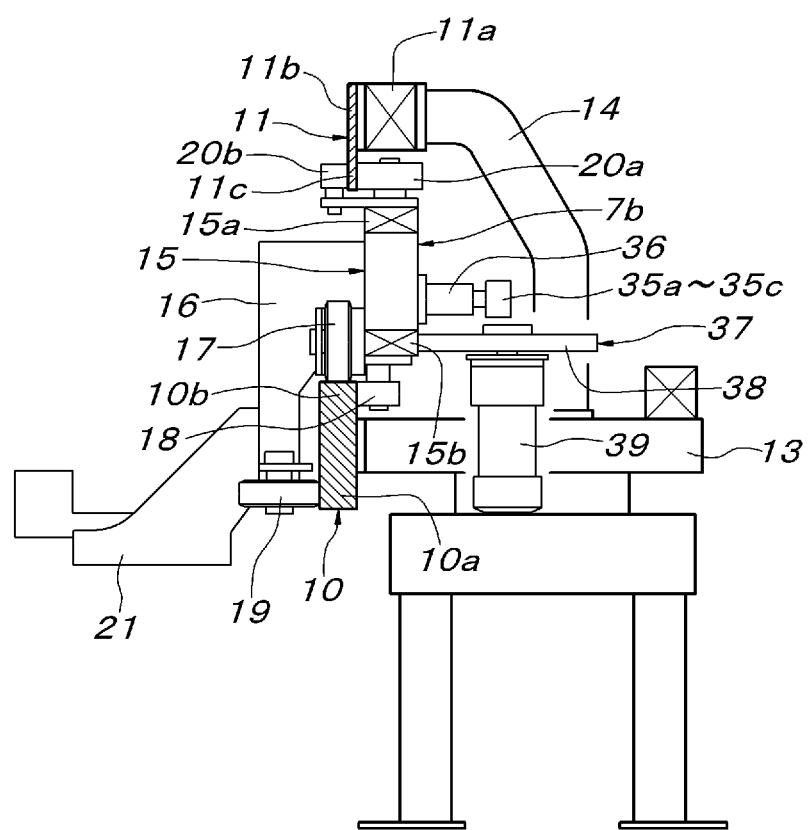
FIG. 10 is a front view showing a friction drive means with respect to the carriage unit on one side.
Figure 11:
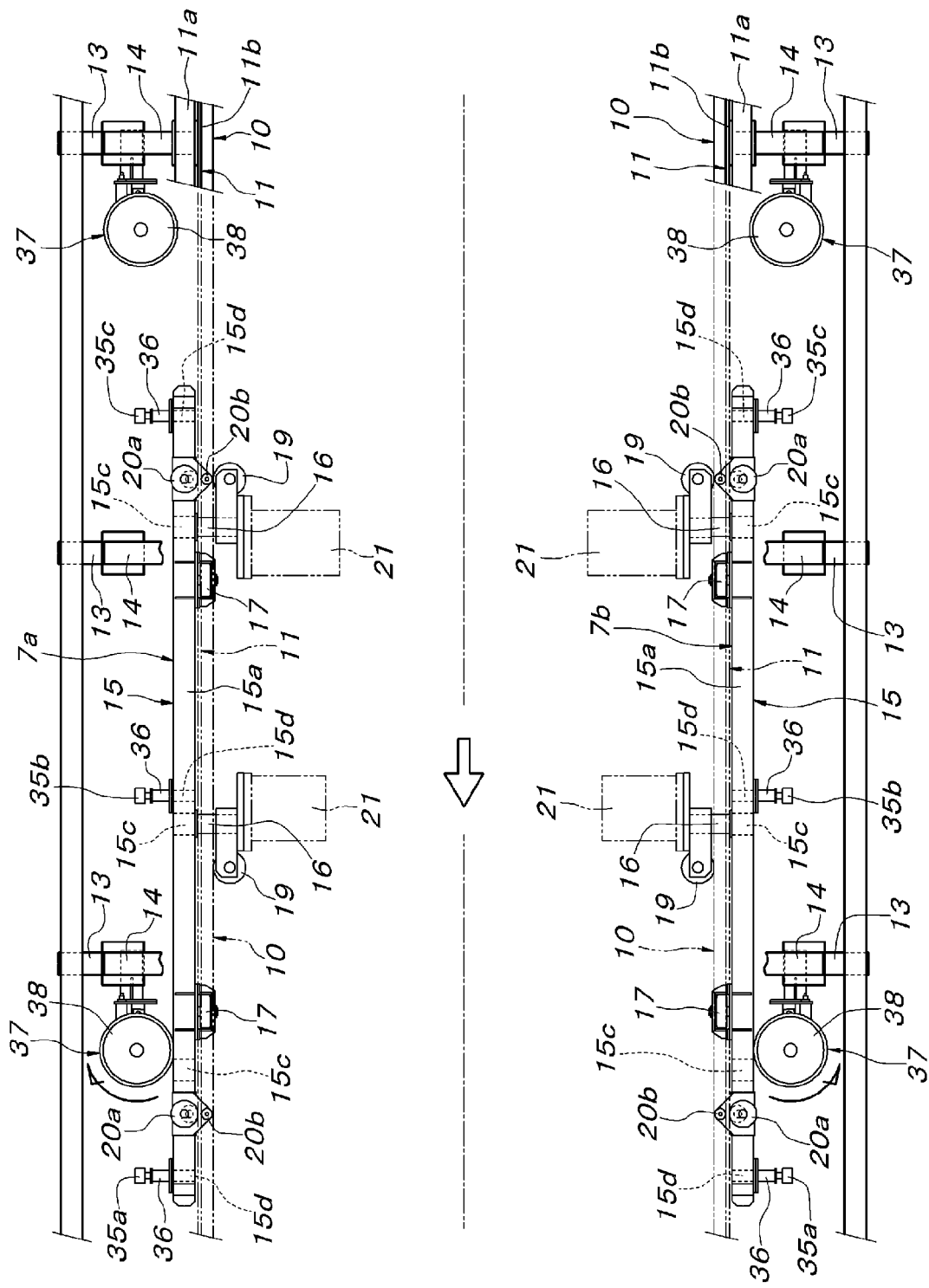
FIG. 11 is a plan view showing the conveying carriages and the friction drive means therefor at a lower carriage return path.

The carriage main body 15 of each carriage unit 7a, 7b is such that a pair of upper and lower horizontal long frame materials 15a, 15b having the same length as the entire length of the carriage main body 15 are coupled and integrated with each other at positions appropriately apart in the longitudinal direction of the frame materials by respective three main coupling members 15c and auxiliary coupling members 15d as shown in FIGS. 6, 10, and 11. The main wheel 17 is attached inside the lower horizontal long frame material 15b. The outer positioning roller 18 is attached below the lower horizontal long frame material 15b. The steady rollers 20a, 20b are attached above the upper horizontal long frame material 15a. The conveyed object supporting tool mounting members 16 attached with the inner positioning rollers 19 are attached to two main coupling members 15c. The driven rollers 35a to 35c are correspondingly attached to three auxiliary coupling members 15d. Each friction drive means 37 at the lower carriage return path 3 is a known one that is composed of a friction drive wheel 38 urged so as to pressure-contact with an outer surface of the lower horizontal long frame material 15b of the carriage main body 15, and a motor 39 rotationally driving this friction drive wheel 38 as shown in FIG. 10 and FIG. 11. The friction drive means 37 are attached to the lower cantilever support members 13 located at the foregoing intervals among the lower cantilever support members 13 supporting the lower main guide rail 10 at the lower carriage return path 3.

Further, lower main guide rails 40a, 41a and upper auxiliary guide rails 40b, 41b are disposed at the elevating carriage 4a of the carriage lifting and transfer device 4 and the elevating carriage 5a of the carriage lowering and transfer device 5. The elevating carriage 4a and the elevating carriage 5a are also provided with frictionally-driven carriage lead-in/sending-out means 42, 43 having the same structure as the friction drive means 37. The lower main guide rails 40a, 41a and the upper auxiliary guide rails 40b, 41b have the same structure as the lower main guide rail 10 and the upper auxiliary guide rail 11 constituting the movement paths for the respective carriage units 7a, 7b at the upper horizontal conveyance path 2 and the lower carriage return path 3, and are connected with these lower main guide rail 10 and upper auxiliary guide rail 11 by ascent and descent of the elevating carriages 4a, 5a.

In the conveyance equipment configured as above, the object to be conveyed W subjected to predetermined work at the upper horizontal conveyance path 2 is carried from the side opposite to the side where the lower carriage return path 3 is located by an appropriate means, onto an empty conveying carriage 1 having been sent from the terminal end of the lower carriage return path 3 into the elevating carriage 4a waiting at the descent limit level of the carriage lifting and transfer device 4. Specifically, both of the lateral sides of the bottom of the object to be conveyed W are supported by conveyed object supporting tools 21 provided for the pair of left and right carriage units 7a, 7b of the conveying carriage 1. The conveying carriage 1 loaded with the object to be conveyed W in this manner is transferred to the ascent limit level that is connected with the upper horizontal conveyance path 2, by ascent of the elevating carriage 4a. Subsequently, this conveying carriage 1 is sent out into the upper horizontal conveyance path 2 at a predetermined timing by the carriage lead-in/sending-out means 42 provided for the elevating carriage 4a. As a result, the leading driven roller 35a of the driven rollers 35a to 35c provided for the pair of left and right carriage units 7a, 7b of the conveying carriage 1 are automatically engaged with the pair of left and right screw shafts 8a, 8b rotationally driven in a predetermined rotational direction at the same fixed speed, and led into the upper horizontal conveyance path 2 by the screw shafts 8a, 8b. Meanwhile, the main wheels 17, the outer positioning rollers 18, the inner positioning rollers 19, and steady rollers 20a, 20b provided for each of the carriage units 7a, 7b are automatically transferred from the lower main guide rail 40a and the upper auxiliary guide rail 40b on the elevating carriage 4a onto the lower main guide rail 10 and the upper auxiliary guide rail 11 disposed at the upper horizontal conveyance path 2.

By the foregoing operation, the pair of left and right carriage units 7a, 7b of the conveying carriage 1 sent to the upper horizontal conveyance path 2 receives a thrust from the respective screw shafts 8a, 8b and synchronously travel on the upper horizontal conveyance path 2 at the fixed speed. The object to be conveyed W whose both of the lateral sides of the bottom are supported by the pair of left and right carriage units 7a, 7b via the conveyed object supporting tools 21 is conveyed at the fixed speed while keeping a fixed posture. Further, the conveying carriage 1 supporting the object to be conveyed W is sent to the upper horizontal conveyance path 2 one after another so as for an interval between front and rear conveying carriages 1, in other words, an interval between objects to be conveyed W to be constant. Accordingly, the objects to be conveyed W whose both of the lateral sides of the bottom are supported by the respective carriage units 7a, 7b are conveyed at the fixed speed at the fixed intervals at this upper horizontal conveyance path 2, and the predetermined work is carried out with respect to the bottom of each object to be conveyed W from on the floor slab 6.

The conveying carriage 1 supporting the object to be conveyed W to which work has been finished is sent out by the screw shafts 8a, 8b onto the elevating carriage 5a of the carriage lowering and transfer device 5 waiting at the ascent limit level that is connected to the upper horizontal conveyance path 2, and also led into a fixed position on the elevating carriage 5a by the carriage lead-in/sending-out means 43 provided for the elevating carriage 5a. By descent of the elevating carriage 5a, the conveying carriage 1 is transferred to the descent limit level that is connected to the lower carriage return path 3. After that, the object to be conveyed W on the conveying carriage 1 is carried to the side opposite to the side where the lower carriage return path 3 is located by an appropriate means, and the pair of left and right carriage units 7a, 7b of the conveying carriage 1 having been emptied are sent out to the beginning of the lower carriage return path 3 by the carriage lead-in/sending-out means 43 provided for the elevating carriage 5a.

The pair of left and right carriage units 7a, 7b of the empty conveying carriage 1 having been sent to the lower carriage return path 3 are individually driven by the friction drive means 37 at a speed not less than the traveling speed at the upper horizontal conveyance path 2, and automatically stored to the upstream side from the terminal end of the lower carriage return path 3. Under circumstances where the elevating carriage 4a of the carriage lifting and transfer device 4 waits at the descent limit level that is connected to the lower carriage return path 3, the pair of left and right carriage units 7a, 7b of the leading conveying carriage 1 stored at the lower carriage return path 3 are sent out onto the elevating carriage 4a by the friction drive means 37 and also led into the fixed position by the carriage lead-in/sending-out means 42 provided for this elevating carriage 4a, and then prepare for transfer of the object to be conveyed W. The following conveyed carriages 1 stored at the lower carriage return path 3 are driven in sequence by the friction drive means 37, and constantly wait bumper to bumper from the terminal end of the lower carriage return path 3. That is, each friction drive means 37 provided for the lower carriage return path 3 is automatically controlled so as to operate as above.

The pair of left and right carriage units 7a, 7b of the conveying carriage 1 are configured to be provided with three driven rollers 35a to 35c, and these driven rollers 35a to 35c are each configured to be engaged with the screw shafts 8a, 8b in the foregoing embodiment. Thus, smooth drive cannot be expected unless each interval between these three driven rollers 35a to 35c is an integral multiple of a pitch of the spiral slit in the entire area of the screw shafts 8a, 8b. There is the possibility that an excessive force in the propulsion direction may act upon one or two of the three driven rollers 35a to 35c due to variations in mounting position accuracy of each driven roller 35a to 35b, manufacturing accuracy of each screw unit 23 itself constituting the screw shafts 8a, 8b, the length and phase of the non-driving area between the screw units 23, etc. To avoid this phenomenon, the bearing member 36 pivotally supporting each driven roller 35a to 35c can be configured to be supported to move freely within a fixed range in the carriage traveling direction (the axial direction of the screw shafts 8a, 8b) and also to be urged and held at a middle position within the freely movable range, instead of being fixed to the carriage main body 15 (the auxiliary coupling member 15d).

Figure 12:
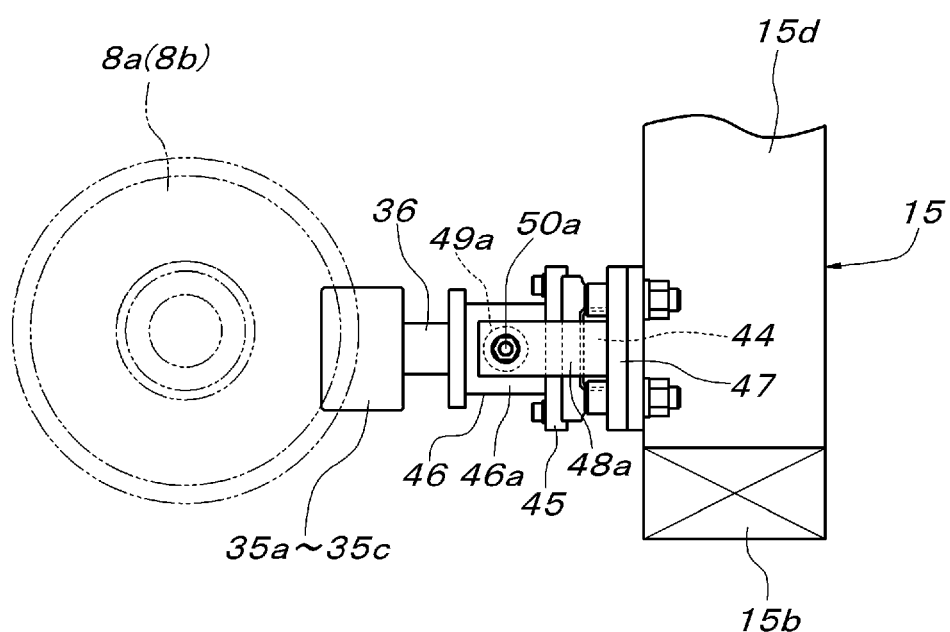
FIG. 12 is a front view showing details of a support structure of a driven roller of the carriage unit.
Figure 13:
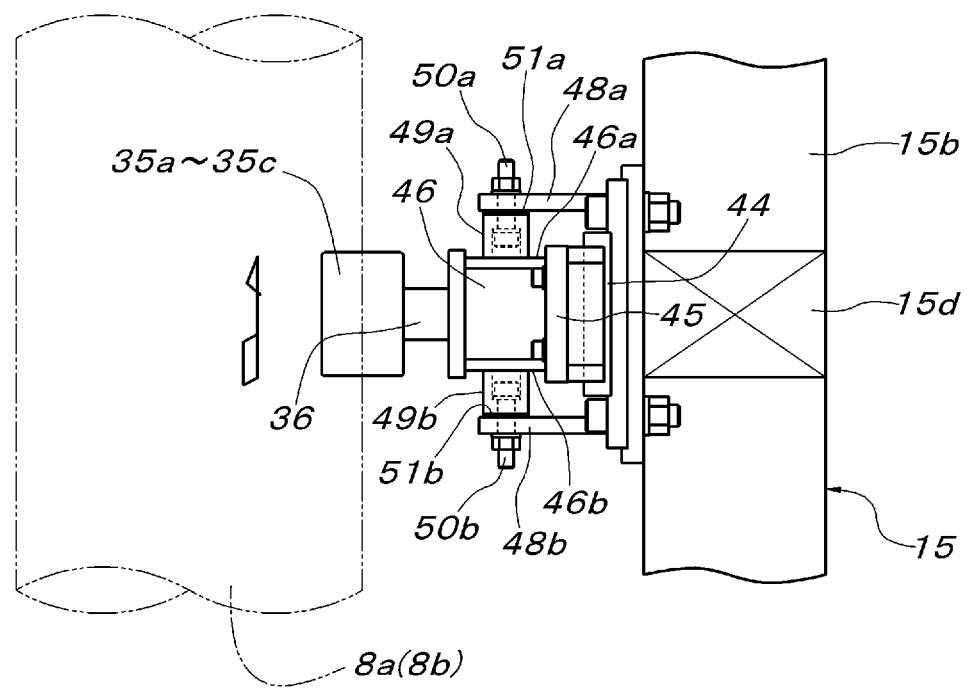
FIG. 13 is a plan view of FIG. 12.

Specifically, as shown in FIG. 12 and FIG. 13, a movable base 45 slidable within a fixed range in the carriage traveling direction (the axial direction of the screw shafts 8a, 8b) via a slide guide rail 44 is provided for the auxiliary coupling member 15d of the carriage main body 15 attached with the bearing member 36 at which distal end one of the driven rollers 35a to 35c is pivotally supported. The bearing member 36 is attached to the movable base 45 via a prismatic member 46. A pair of front and rear column members 48a, 48b are protruded from a mounting board 47 of the slide guide rail 44 in such a manner so as to sandwich the prismatic member 46 from both front and rear sides in the movement direction of the movable base 45. Elastic members 49a, 49b such as rubber are attached to inner surfaces of the column members 48a, 48b by bolts and nuts 50a, 50b. These elastic members 49a, 49b pressure-contact with both front and rear side faces 46a, 46b of the prismatic member 46 by appropriate initial compressive stress and urge and hold the bearing member 36 (the prismatic member 46) at a middle position within the slidable range. Further, a plurality of shim plates 51a, 51b for adjusting the strength of the initial compressive stress of the elastic members 49a, 49b by selecting the number used can be laid between the elastic members 49a, 49b and the column members 48a, 48b.

The movement path for each carriage unit 7a, 7b is constituted of the lower main guide rail 10 guiding the lower end side of the carriage units 7a, 7b, and the upper auxiliary guide rail 11 guiding the upper end side of the carriage units 7a, 7b in the foregoing embodiment. However, only lower main guide rail 10 can also constitute the movement path for the carriage units 7a, 7b if inward moment loads acting upon the respective carriage units 7a, 7b due to the weight of the object to be conveyed supported between the pair of left and right carriage units 7a, 7b are small, for example.

INDUSTRIAL APPLICABILITY

The conveyance device of the present invention can be utilized as a conveyance means for automobile vehicle bodies in a work line where work with respect to the bottom of the automobile vehicle body is carried out.

DESCRIPTION OF SIGNS 1 conveying carriage
2 upper horizontal conveyance path
3 lower carriage return path
4 carriage lifting and transfer device
5 carriage lowering and transfer device
6 floor slab
7a, 7b carriage unit
8a, 8b screw shaft
9 screw shaft drive means
10 lower main guide rail
11 upper auxiliary guide rail
13 lower cantilever support member
14 upper cantilever support member
15 carriage main body
16 conveyed object supporting tool mounting member
17 main wheel
18 outer positioning roller
19 inner positioning roller
20a, 20b steady roller
21 conveyed object supporting tool
23 screw unit
24 shaft coupling
25 relay shaft body 26 transmission means
27, 39 motor
28 horizontal traverse transmission shaft
29a, 29b, 31a-31d right-angled transmission mechanism
30a, 30b horizontal relay transmission shaft
30c, 30d vertical relay transmission shaft
32a, 32b relay shaft body
33a, 33b gear mechanism
35a-35c driven roller
37 friction drive means
38 friction drive wheel
W object to be conveyed

What is claimed is:

1. A conveyance device comprises a conveying carriage having left and right carriage units for individually supporting left and right sides of an object to be conveyed, a carriage drive means for driving and propelling the left and right carriage units to move the conveying carriage along a conveyance path, wherein the carriage drive means comprises left and right screw shafts pivotally supported along respective movement paths of the carriage units, a driven roller pivotally supported to each carriage unit and engaged with a respective screw shaft, a transmission means for linking and coupling the left and right screw shafts to each other outside of the conveyance path, and a single motor linking and driving the left and right screw shafts via the transmission means, and wherein the movement path for each carriage unit comprises a lower guide rail guiding a lower end side of the carriage unit and an upper guide rail guiding an upper end side of the carriage unit, and both of the upper and lower guide rails are individually supported via individual upper and lower cantilever support members disposed at a side opposite to a side where the conveyance path is located with respect to the respective guide rails, and the driven roller of each carriage unit protrudes from each carriage unit to an outside opposite to the side where the conveyance path is located, at a height between the upper and lower guide rails, and the screw shaft is pivotally supported so as to penetrate between the upper and lower cantilever support members.

2. The conveyance device according to claim 1, wherein the transmission means comprises a horizontal traverse transmission shaft horizontally crossing under the conveyance path, left and right vertical relay transmission shafts linked and coupled to both end portions of the horizontal traverse transmission shaft, and a gear mechanism linking and coupling the vertical relay transmission shafts and the respective screw shafts, and wherein the motor is linked and coupled to one end of the horizontal traverse transmission shaft.

3. The conveyance device according to claim 2 wherein the movement path for each carriage unit comprises a lower guide rail guiding a lower end side of the carriage unit and an upper guide rail guiding an upper end side of the carriage unit, and both of the upper and lower guide rails are individually supported via individual upper and lower cantilever support members disposed at a side opposite to a side where the conveyance path is located with respect to the respective guide rails, and the driven roller of each carriage unit protrudes from each carriage unit to an outside opposite to the side where the conveyance path is located, at a height between the upper and lower guide rails, and the screw shaft is pivotally supported so as to penetrate between the upper and lower cantilever support members.

4. The conveyance device according to claim 1, wherein each carriage unit comprises a carriage main body disposed at a side where the respective screw shaft is located with respect to both the upper and lower guide rails, a conveyed object supporting tool mounting member extending downward from the carriage main body to an inside where the conveyance path is located, between both the upper and lower guide rails, a main wheel pivotally supported at the side where the conveyance path for the carriage main body is located so as to be rotatable about a horizontal axis and rolling on the lower main guide rail, an outer positioning roller pivotally supported at a lower end of the carriage main body so as to be rotatable about a vertical axis and rolling on a part of an outer surface of the lower main guide rail and above the cantilever support member, an inner positioning roller pivotally supported at the conveyed object supporting tool mounting member so as to be rotatable about the vertical axis and rolling on a lower end portion of an inner surface of the lower main guide rail, and left and right steady rollers pivotally supported at an upper end portion of the carriage main body so as to be rotatable about the vertical axis and sandwiching a lower end portion of the upper auxiliary guide rail from both inside and outside.

5. The conveyance device according to claim 3, wherein each carriage unit comprises a carriage main body disposed at a side where the respective screw shaft is located with respect to both the upper and lower guide rails, a conveyed object supporting tool mounting member extending downward from the carriage main body to an inside where the conveyance path is located, between both the upper and lower guide rails, a main wheel pivotally supported at the side where the conveyance path for the carriage main body is located so as to be rotatable about a horizontal axis and rolling on the lower main guide rail, an outer positioning roller pivotally supported at a lower end of the carriage main body so as to be rotatable about a vertical axis and rolling on a part of an outer surface of the lower main guide rail and above the cantilever support member, an inner positioning roller pivotally supported at the conveyed object supporting tool mounting member so as to be rotatable about the vertical axis and rolling on a lower end portion of an inner surface of the lower main guide rail, and left and right steady rollers pivotally supported at an upper end portion of the carriage main body so as to be rotatable about the vertical axis and sandwiching a lower end portion of the upper auxiliary guide rail from both inside and outside.

* * * * *